United States Patent
Birdsley et al.

(10) Patent No.: US 7,196,800 B1
(45) Date of Patent: Mar. 27, 2007

(54) SEMICONDUCTOR DIE ANALYSIS AS A FUNCTION OF OPTICAL REFLECTIONS FROM THE DIE

(75) Inventors: Jeffrey D. Birdsley, Cedar Park, TX (US); Rama R. Goruganthu, Austin, TX (US); Michael R. Bruce, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 565 days.

(21) Appl. No.: 10/205,780

(22) Filed: Jul. 26, 2002

Related U.S. Application Data (60) Provisional application No. 60/307,992, filed on Jul. 26, 2001.

(51) Int. Cl.
*G01B 11/02* (2006.01)
(52) U.S. Cl. ..................................... 356/505
(58) Field of Classification Search ................ 356/493, 356/503, 504, 505
See application file for complete search history.

(56) References Cited

U.S. PATENT DOCUMENTS

| | | | | |
|---|---|---|---|---|
| 5,362,356 A | * | 11/1994 | Schoenborn | 216/60 |
| 5,440,141 A | * | 8/1995 | Horie | 250/559.27 |
| 5,452,953 A | * | 9/1995 | Ledger | 356/632 |
| 5,465,154 A | * | 11/1995 | Levy | 356/632 |
| 5,969,805 A | * | 10/1999 | Johnson et al. | 356/72 |
| 6,028,669 A | * | 2/2000 | Tzeng | 356/504 |
| 6,211,961 B1 | * | 4/2001 | Maris | 356/432 |
| 6,261,152 B1 | * | 7/2001 | Aiyer | 451/6 |
| 6,277,657 B1 | * | 8/2001 | Nozawa et al. | 438/8 |
| 6,392,756 B1 | * | 5/2002 | Li et al. | 356/632 |
| 6,687,014 B2 | * | 2/2004 | Zaidi et al. | 356/504 |
| 6,806,166 B1 | * | 10/2004 | Birdsley et al. | 438/459 |

\* cited by examiner

*Primary Examiner*—Gregory J. Toatley, Jr.
*Assistant Examiner*—Michael A. Lyons (57) ABSTRACT

A light reflected from a semiconductor die is used for enhanced control of substrate removal from the die. According to an example embodiment of the present invention, light reflected from a semiconductor die as it is undergoing substrate removal is used to detect the progress of the substrate removal process, and the removal process is controlled therefrom. In different embodiments, the reflected light is used to detect the removal of a portion of a layer of material in the die and to detect the removal of an entire layer of material.

21 Claims, 5 Drawing Sheets

SEMICONDUCTOR DIE ANALYSIS AS A FUNCTION OF OPTICAL REFLECTIONS FROM THE DIE

This is a conversion of U.S. Provisional Patent Application Ser. No. 60/307,992, filed on Jul. 26, 2001, to which Applicant claims priority under 35 U.S.C. § 119(e).

FIELD OF THE INVENTION

The present invention relates generally to semiconductor devices and their fabrication and, more particularly, to semiconductor devices and their manufacture involving substrate removal.

BACKGROUND OF THE INVENTION

The semiconductor industry has recently experienced technological advances that have permitted dramatic increases in circuit density and complexity, and equally dramatic decreases in power consumption and package sizes for integrated circuit devices. Present semiconductor technology now permits single-chip microprocessors with many millions of transistors operating at speeds of hundreds of millions of instructions per second to be packaged in relatively small, air-cooled semiconductor device packages. A byproduct of these technological advances has been an increased demand for semiconductor-based products, as well as increased demand for these products to be fast, reliable, and inexpensive. These and other demands have led to increased pressure to manufacture a large number of semiconductor devices at an efficient pace while increasing the complexity and improving the reliability of the devices.

As the manufacturing processes for semiconductor devices and integrated circuits increase in difficulty, methods for testing and debugging these devices become increasingly important. Not only is it important to ensure that individual chips are functional, it is also important to ensure that batches of chips perform consistently. In addition, the ability to detect a defective manufacturing process early is helpful for reducing the possibility of manufacturing a defective device.

Sometimes it is helpful to access certain nodes or to reconfigure conductors in an integrated circuit die for failure analysis, design debug, or other testing purposes. This access is generally done by removing a portion of material from the die to access the node, or exposing the node by creating an access hole and subsequently depositing a metal to electrically access the node. These access holes need to have high aspect ratios. Removing silicon, such as by milling trenches having high aspect ratios, is slow and almost impractical for silicon thickness greater than 10 microns. In addition, there is a possibility of damaging the integrated circuit if the milling process is not accurately controlled.

One particular type of integrated circuit device that requires removal of material from the die for accessing the integrated circuit is the flip-chip die. Flip-chip dies include bonding pads that have metal (solder) bumps through which electrical connection to a package is made when the die is "flipped" over and soldered to the package. Each bump connects to a corresponding package inner lead. The resulting packages are low profile, have low electrical resistance and a short electrical path. The output terminals of the package, which are sometimes ball-shaped conductive bump contacts, are typically disposed in a rectangular array. These packages are occasionally referred to as "Ball Grid Array" (BGA) packages. Alternatively, the output terminals of the package may be pins and such packages are commonly known as pin grid array (PGA) packages.

Once the die is attached to such a package, the back side portion of the die remains exposed. The transistors and other circuitry are generally formed in a very thin, epitaxially-grown silicon layer on a single crystal silicon wafer from which the die is singulated. The side of the die including the epitaxial layer containing the transistors, and the other active circuitry is often referred to as the circuit side of the die or front side of the die. The circuit side of the die is positioned very near the package and opposes the back side of the die. Between the back side and the circuit side of the die is silicon.

The positioning of the circuit side near the package provides many advantages. However, in some instances orienting the die with the circuit side face down on a substrate is disadvantageous. Due to this orientation of the die, the transistors and circuitry near the circuit side are not directly accessible for testing, modification or other purposes. Therefore, access to the transistors and circuitry near the circuit side is through material in the back side of the chip. Successful access to the circuitry requires accurate and controllable removal of the material in the back side.

In addition to accessing circuitry in a flip-chip die via the backside of the die, accessing through the circuit side of flip-chips, or accessing circuitry in other types of integrated circuit dies may also require the removal of material. Accessing the circuitry is important for analysis at various stages of manufacture of the devices, including post-manufacturing analysis.

For these and other reasons, a method and system for controlled removal of material from IC devices would be beneficial for analyzing the devices. In particular, it is important to have the ability to determine the endpoint of the removal process with sufficient accuracy to avoid milling off or otherwise damaging the node to which access is being sought. Such damage can inhibit further device analysis, or can result in analysis information that is inaccurate or misleading. In addition, it is also important to detect how far the removal process has proceeded in order to more efficiently and more accurately control the removal process.

SUMMARY OF THE INVENTION

The present invention is directed to the control of substrate removal from a semiconductor die, and is exemplified in a number of implementations and applications, some of which are summarized below.

According to an example embodiment of the present invention, substrate is removed from a semiconductor die as a function of light reflected from the die. Light is directed at the die during a substrate removal process, and reflections of the light are detected. The reflected light is used to detect the progress of the substrate removal, such as by detecting that a portion of a layer in the substrate has been removed and/or by detecting that an entire layer of the substrate has been removed. In this manner, control of substrate removal from a semiconductor die is improved.

In a more particular example embodiment of the present invention, substrate is removed from a semiconductor die having target circuitry in a circuit side opposite a back side. A portion of substrate is removed from the back side and an exposed region is formed. Light is directed at the exposed region, and an interference pattern of light reflected from the exposed region and from the target circuitry is detected. The number of fringes in the interference pattern is detected and used with a known wavelength of the light as it passes through substrate in the die to detect the distance between the exposed region and the target circuitry.

In another example embodiment of the present invention, light reflected from an exposed surface of the die is detected and used to detect the progress of substrate removal from the die. The amount of light reflected is related to the index of refraction of the exposed surface (e.g., to the reflectivity of the exposed surface). It has been discovered that, by detecting the amount of light reflected from the die, the removal of a first layer and exposure of a second layer in the die can be detected as a change in the amount of reflected light that is due to a difference in reflectivity of the first and second layers. In this manner, the removal of an entire layer can be detected and used, for example, as an endpoint of a substrate removal process.

According to another example embodiment of the present invention, a system is adapted for controlling substrate removal from a semiconductor die. The system includes a light source adapted to direct light at the die and a light detector adapted to detect first and second reflected portions of light from the die. A controller is adapted to control a substrate removal device in response to the detected portions of the light.

The above summary of the present invention is not intended to describe each illustrated embodiment or every implementation of the present invention. The figures and detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of semiconductor devices requiring or benefiting from controlled substrate removal. The invention has been found to be particularly suited for post-manufacturing failure analysis of target circuitry buried within relatively thick silicon in semiconductor devices. While the present invention is not necessarily limited to such devices, various aspects of the invention may be appreciated through a discussion of various examples using this context.

In an example implementation of the present invention, light is directed at a semiconductor die undergoing substrate removal. Portions of the light are reflected from material at two regions in the die and are detected. The detected light from the two regions is compared and used as an indication of the progression of the substrate removal process. This is particularly useful, for example, for controlling the rate of substrate removal or to detect an endpoint of the removal process. In this manner, the efficiency and accuracy of the substrate removal process is enhanced.

Figure 1:
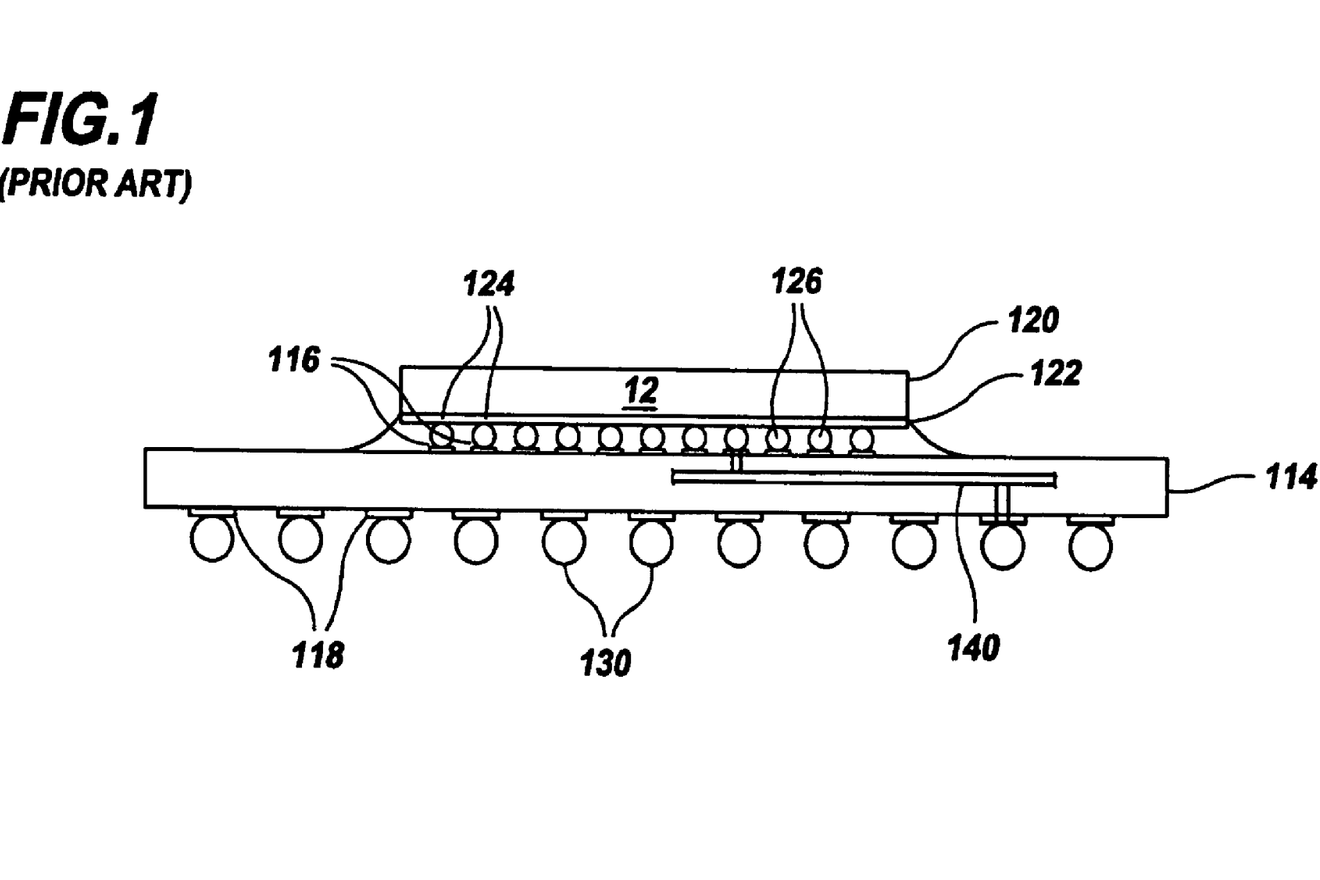
FIG. 1 is an example side view of a flip chip packaged integrated circuit suitable for use in connection with an example embodiment of the present invention.

The present invention is applicable to a variety of types of semiconductor dies. For example, FIG. 1 is a typical flip-chip type die 12 bonded to a package 114 that can be analyzed using one or more of the various example embodiments discussed in connection with the present invention. The die 12 is attached to the package 114 via pads 124 on the die 12, solder bumps 126 and pads 116 on the package 114. The die is electrically connected to pins 130 via interconnects 140 and pads 118 at the package 114. In common applications, pins 130 are coupled to a device or system that is to employ the use of the die. The present invention is particularly useful for such a die because, as addressed above, access to circuitry in the circuit layer 122 often requires substrate removal.

Reflected light from the die can be used for controlling substrate removal in various manners. For example, it is often desirable to remove substrate from a typical integrated circuit die having a variety of layers, including materials such as bulk silicon (e.g., 120), epitaxial silicon, a well, buried oxide, or a junction. Each layer has at least one property, such as doping density, thickness, temperature or a refractive index, that affects the rate at which light passes through the layer (e.g., each layer has an index of refraction "n"). In addition, the type of light used affects the way the light travels in the die. For instance, light having a wavelength less than about 1100 nanometers generally experiences attenuation as it passes through the die, and light having a wavelength greater than about 1100 nanometers generally does not experience attenuation. Substrate removal is controlled by directing light at the die and monitoring a change in light reflected from the die as each layer is removed. The change provides an indication of the progression of the substrate removal process and is monitored and used to control the substrate removal process.

In another example embodiment, a known refractive index of a particular layer in the die is used to determine how much of a particular layer has been removed. Light is directed at the die and a reflected portion of the light is detected. The reflected portion is affected by the refractive index of material through which the light passes. As material is removed from a particular layer, light takes less time to pass through the layer. This difference in time is used in connection with the known refractive index to detect the progression of the substrate removal. This is useful for substrate removal processes including global removal of most or all of a layer, and local substrate removal of a selected portion of a layer. The difference in time that it takes the light to pass through the layer may, for example, be detected by pulsing or chopping laser light directed at the die, and detecting the time that the pulsed, or chopped, light takes to pass through the layer. The detected time is then compared to the amount of time it would take the light to be reflected using, for example, a reference laser passing the same distance through air. In addition, this implementation can also be accomplished without necessarily needing to detect the strength of the reflected light.

In another implementation, a change in the reflected light from an exposed surface of the die is used to detect that a first layer of material has been removed from the die, exposing a second layer below the first layer. When the first layer has been removed, the reflectivity of the first layer no longer affects the reflected light, and the amount of light reflected from the exposed surface is related to the reflectivity of the second layer. The reflectivity (R) of an exposed surface of material is given by the following equation, $$R = \left(\frac{n_1 - n_0}{n_1 + n_0}\right)^2, \quad \text{(Equation 1)}$$

where $n_1$ is the index of refraction of the exposed surface, and $n_0$ is the index of refraction of whatever material is over the exposed surface (e.g., $n_0$ is approximately equal to 1 when the process is performed in air). When the first layer is removed, the refractive index "$n_1$" in Equation 1 becomes that of the second layer, the reflectivity of the exposed surface changes and the amount of light reflected exhibits characteristics related to the new reflectivity value. This change in the reflected light is detected and used to determine that the first layer has been removed, and the progression of the substrate removal can thereby be detected and used to control the substrate removal.

Figure 2A:
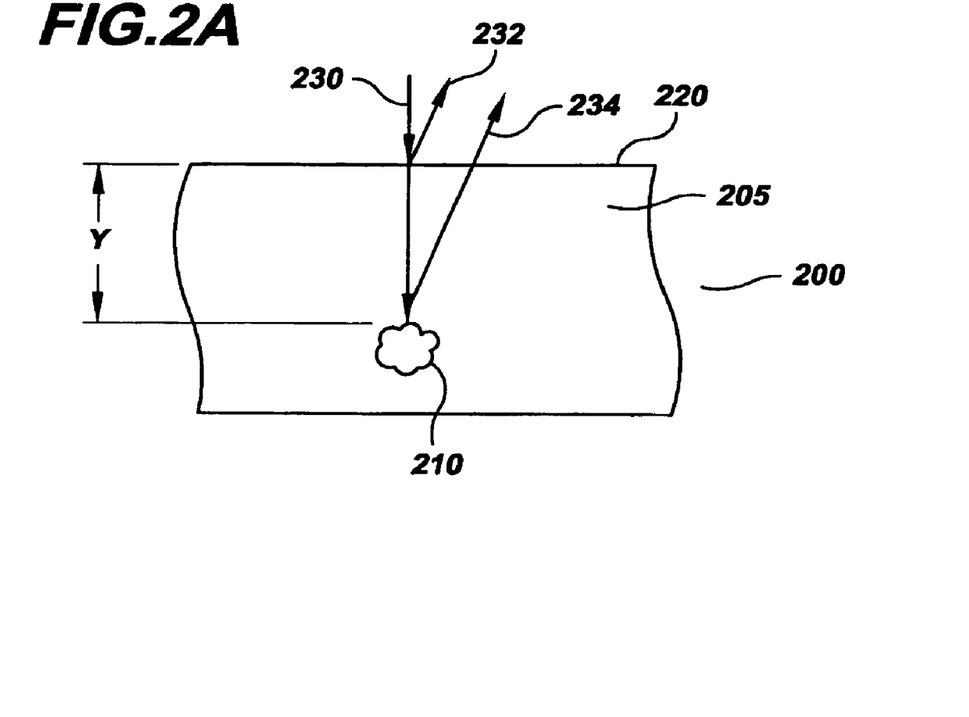
FIG. 2A is a semiconductor die undergoing analysis, according to an example embodiment of the present invention.

FIG. 2A is a portion 200 of a semiconductor die undergoing substrate removal, according to an example embodiment of the present invention. Light 230, such as an IR laser beam, is directed at a surface 220 of the die. A reflected portion 232 of the light reflects off the surface, and another portion of the light passes into substrate 205. A second reflected portion 234 reflects off a selected region 210 in the die and passes back through the substrate 205 and the surface 220. The reflected light is detected and used to control the substrate removal.

In one implementation, the reflected light is used to determine the distance Y from the surface 220 to the selected portion 210. The distance can be determined using a detected change in phase of the reflected portion 234 (e.g., as compared to the phase of the light 230 directed to the die). The phase of the reflected portion 234 is dependent in part upon the distance Y and the refractive index of the substrate 205. The light that passes into the substrate travels through the substrate at a slower rate due to a change in wavelength that occurs as the frequency remains constant while the light travels through a medium (e.g., the substrate) having a density greater than the air or other medium that the light 230 passes through. Therefore, the phase of the reflected portion 234 is different from that of the incident light 230 (and, similarly, of the reflected portion 232). The differences in phase result in a fringe pattern from the detected reflection that is used to determine the distance Y. In one particular implementation, the fringe pattern (and corresponding difference in phase) is detected using an external reference of the incident light, such as using a beam splitter and a mirror to direct a portion of the incident light to an interferometer.

By counting the number of fringes in the fringe pattern, the amount of phase delay can be detected and used with the known wavelength and frequency of the light 230 to determine the distance Y. For example, the reflected portions 232 and 234 may constructively or destructively interfere with each other on a point-by-point basis depending upon the net path difference between them. This results in a pattern of light and dark fringes. Effectively, the difference in path length between reflected portions 232 and 234 (e.g., approximately 2Y), causes a change in interference pattern from the two reflected portions that is used to determine the progression of the substrate removal process. In another particular implementation, a reference laser beam is used to generate the reflected portion 232.

For example, if 100 fringes are counted and the wavelength of the light as it passes through the substrate is 1 micron, the light traveled approximately 50 microns into the substrate and reflected back through the 50 microns of substrate. This count can be used to determine the distance Y from the exposed surface 220 to the selected portion 210. As more substrate is removed, the number of fringes counted decreases and the decrease determination is used to control the substrate removal from the die. Once the amount of substrate remaining over the selected portion 210 reaches a level that is associated with an endpoint of the removal process, the process is stopped.

Figure 2B:
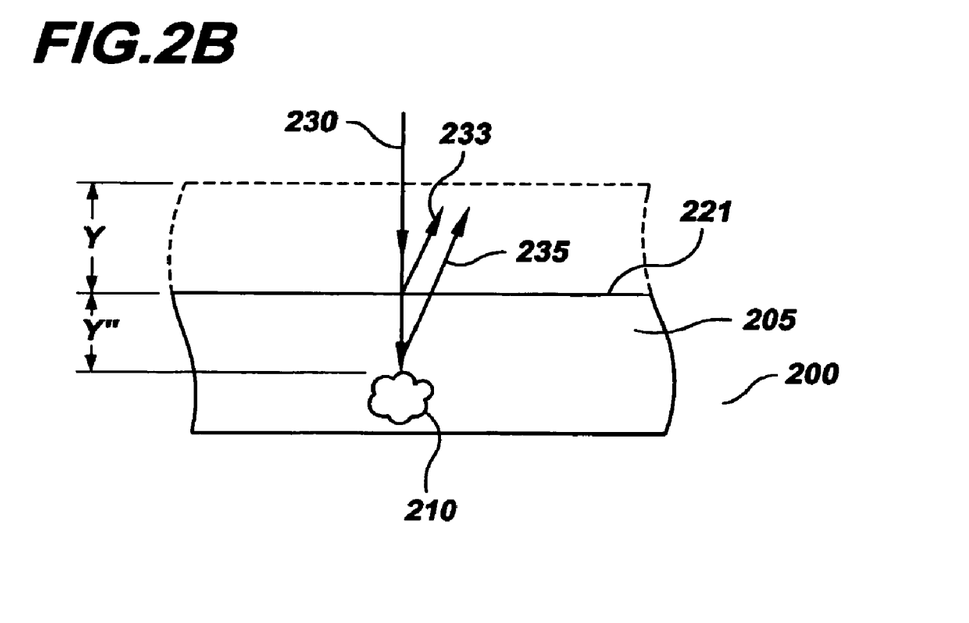
FIG. 2B is the semiconductor die of FIG. 2A having a portion of substrate to removed, according to another example embodiment of the present invention.

In another example embodiment of the present invention, the change in interference pattern is used to determine how much of the substrate 205 has been removed. For example, FIG. 2B shows the semiconductor die of FIG. 2A having had a portion of the substrate 205 removed, as shown by the dashed lines. The light 230 is directed at the exposed surface 221, and the light is reflected as portions 233 and 235. The amount of substrate that has been removed (e.g., Y') is determined by subtracting the number of fringes counted in the above example with FIG. 2A from the number of fringes counted from the die as shown in FIG. 2B. The difference is used in a similar manner to that described above to determine the distance Y', which can then be used to determine the amount of remaining substrate (e.g., Y").

In another example embodiment of the present invention, the rate of change of the interference pattern as substrate is being removed from the die is used to determine the rate of substrate removal from the die. As the interference pattern changes over time, the change in distance over the same amount of time is calculated to determine the substrate removal rate. This rate is used in the control of the removal process, such as to slow down the removal process as an endpoint is neared, to detect the presence of another material, and/or to detect when the endpoint has been reached. For instance, referring again to FIG. 2A and FIG. 2B, the time that it takes to remove the determined amount of substrate Y' from the die 200 can be used to determine the rate of removal.

In still another example embodiment of the present invention, a reference die is subjected to substrate removal while being monitored for the detection of fringe patterns as discussed hereinabove. Selected fringe patterns from the reference die at various stages in the substrate removal process are noted, and the amount of substrate remaining in the die at each selected fringe pattern is determined. The detected pattern from a die under test (DUT) is compared with that from the reference die, and the approximate amount of substrate remaining in the DUT is determined therefrom.

The light 230 may be generated from various sources, such as a common polychromatic source or a monochromatic source, such as a laser. For monochromatic light, the constructive (accentuation) or destructive (cancellation) interference of reflected portions can be used as described hereinabove. In the case of polychromatic light, the interference between the reflected portions causes variation in the color of the light that is detected. This color variation occurs due to the recombination of the light that is detected. When the phase difference equals n (n=an integer) multiplied by the wavelength of the portion (color) of the light being detected, that particular color experiences interference and is canceled. When the phase difference equals ½×n (½ multiplied by n), the corresponding color is accentuated. The combination of cancellation and accentuation of various colors is used to determine the progress of the substrate removal process.

The color change is useful for various applications. For example, as a particular color disappears and reappears during substrate removal, the amount and/or rate of substrate being removed is determined as a function of the wavelength of the color. Each time that the color is cancelled corresponds to an amount of substrate through which the light passes that about equals the wavelength. As colors having different wavelengths disappear and reappear, the corresponding wavelengths can be used to monitor the substrate removal in an accurate manner.

Figure 3A:
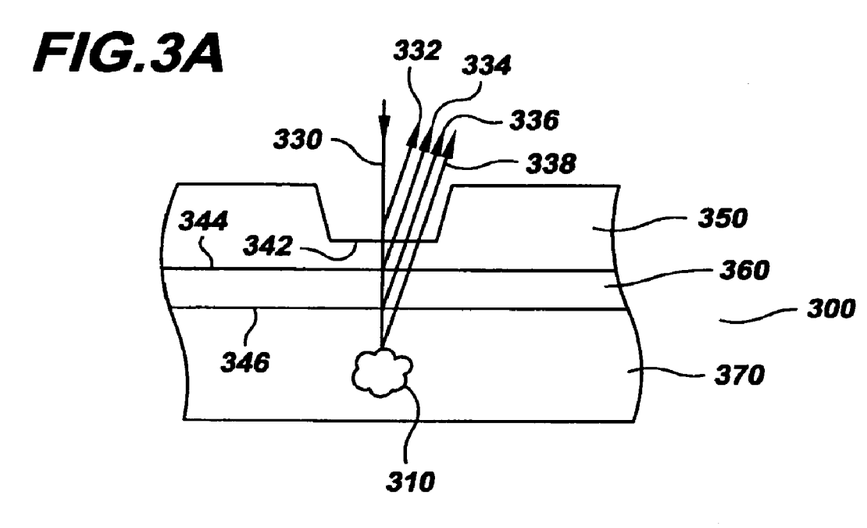
FIG. 3A is a multi-layer semiconductor die undergoing analysis, according to an example embodiment of the present invention.
Figure 3B:
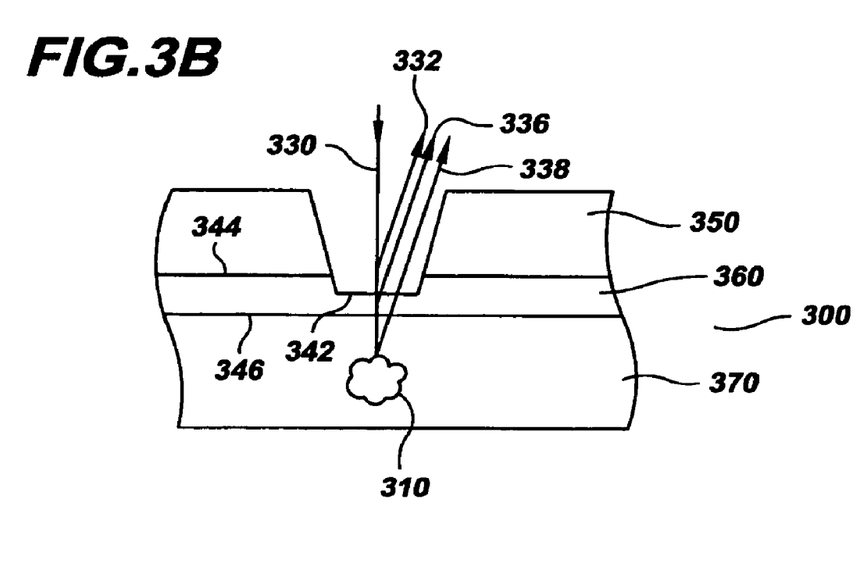
FIG. 3B is the semiconductor die of FIG. 3A having a portion of substrate removed, according to another example embodiment of the present invention.

FIGS. 3A and 3B show a semiconductor die 300 undergoing substrate removal, according to another example embodiment of the present invention. The die 300 includes layers 350, 360 and 370. Layer 360 may, for example, include a buried oxide (BOX) portion of a silicon-on-insulator (SOI) structure. Light 330 is directed at an exposed region 342 of the die. A first reflected portion 332 of the light is reflected off the exposed surface, and the remaining light passes into the die. Similarly, a second reflected portion 334 of the light reflects off an interface 344 between the layers 350 and 360, a third reflected portion 336 of the light is reflected off an interface 346 between layers 360 and 370, and a fourth reflected portion 338 reflects off a selected region 310 in the die. Each of the reflected portions travel back through the first layer and pass out of the die.

The reflected portions are detected and used to detect the progression of the substrate removal process. In one implementation, the thickness of each respective layer and the distance to the selected portion 310 are known and used to determine the thickness of the remaining portion of layer 350 between the exposed region 342 and the interface 344. This may be accomplished, for example, by detecting interference patterns and/or color changes in the reflected light, such as described hereinabove.

In another implementation, a reference die is used to determine a reference rate of change of the reflected portions of light as each layer is removed. A reference is made for the type of material that is being removed from a particular layer. This information is used while removing substrate from a die under test, and the rate of change in the reflected light is used to detect the type of material that is being removed. This is then used with a known composition of the die to detect the portion of substrate that is being removed, and can be used to control the substrate removal process therefrom.

In another example embodiment of the present invention, additional substrate is removed such as shown in FIG. 3B, and the exposed region 342 extends into layer 360. As the interface 344 in the exposed region 342 is removed, the reflected portion 334 shown in FIG. 3A disappears. The remaining reflected portions are 332, 336 and 338. The lack of reflected portion 334 may be detected, for example, by detecting interference patterns from the reflections. When reflected portion 334 no longer exists, the corresponding interference patterns change. These changes include the lack of any change in index of refraction that was contributed by layer 350, and are detected and used to detect the progression of the substrate removal process.

Another example implementation of the present invention involves arranging the semiconductor die in an analysis system adapted to remove substrate from a semiconductor die as a function of reflected light from at least two portions of the die. The detected change in reflected light is used to control substrate removal from the die using, for example, methods including those described hereinabove.

Figure 4:
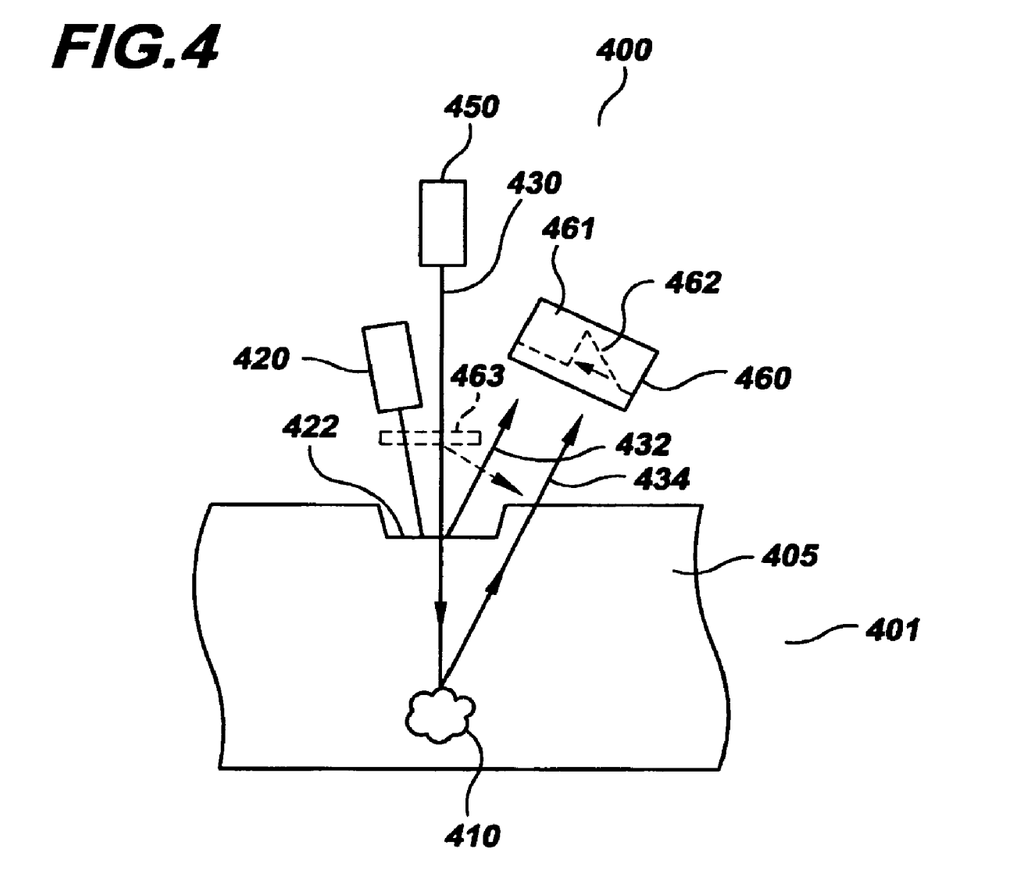
FIG. 4 is a system for removing substrate from a semiconductor die, according to another example embodiment of the present invention.

For example, FIG. 4 shows such an analysis system 400 adapted to control removal of a portion of substrate 405 from a semiconductor die 401, according to another example embodiment of the present invention. The system is adaptable for use with various substrate removal systems. For instance, substrate removal devices to which the system is applicable may include one or more of the various devices commonly used to remove substrate from a semiconductor die, such as a focused ion beam (FIB) or a laser. In one implementation, the system includes a substrate removal device.

Referring back to FIG. 4, a light source 450 is directed at the exposed region 422, and reflected portions 432 from the exposed region 422, and 434 from a selected region 410 in the substrate 405, are detected at a detector 460. In one particular implementation, the substrate removal device 420 and the light source 450 are part of a single laser source. The detector may include, for example, a photodiode, an interferometer or other device adapted to detect reflections from two or sources. The detector is adapted to use the two reflected portions to provide a representation of the substrate removal process that can be used to control the substrate removal process. Controlling the substrate removal process may, for example, include providing a signal based on the progression of the substrate removal process that is based on a refractive index or color of reflected light, as described hereinabove in connection with FIGS. 2A, 2B, 3A and 3B.

In a more particular example embodiment (not shown), the detector 460 includes an interferometer 461 and a reference mirror adapted for detecting the amount of substrate that has been removed as a function of a comparison between a reflected portion of light and a reference portion of the light directed at the die. A beam splitter is used to direct a portion of the light incident upon the die to the mirror as a reference. Interference patterns from light reflected from the die are detected and the number of fringes is counted. This number is correlated to time that is proportional to a change in thickness of material in the die (e.g., the amount of time it takes the material to reflect from the die and to the interferometer).

According to another example embodiment of the present invention, the system 400 is optionally coupled to a computer arrangement (not shown). The computer arrangement is used for interpreting the detected reflected light and for controlling the substrate removal. For example, the computer arrangement can be used to plot a change in reflected light as substrate is removed, which can be monitored and used to control the substrate removal process. The computer can be arranged to signal when the change in detected light reaches a threshold level of particular interest for use in the removal process, such as to indicate approaching or reaching a process endpoint.

One or more threshold levels may be determined by estimating the amount of substrate remaining in the device, or by conducting empirical tests on semiconductor dies while undergoing substrate removal to develop a relationship between the resistance and the substrate removal process. Empirical tests may be used, for instance, to develop a set of curves for particular types of substrate. The results can be placed into graphical form for inspection, or used by the controller without generating a graph. Empirical tests may also be used to determine the change in reflected light as interfaces between layers of substrate in a reference semiconductor die are encountered by the substrate removal process. The relationship developed between the reflected light and the substrate removal process can be used in subsequent substrate removal processes to control the removal process, determine the amount of substrate that has been removed or to estimate the thickness of the remaining substrate.

In another example embodiment of the present invention, the computer arrangement is further coupled to a substrate removal device and configured and arranged to control the substrate removal process. For instance, when the detected light reaches a threshold level, the computer arrangement can send a control signal to the removal device in response to reaching the threshold level. The threshold level may correspond to reaching a portion of the die where it is desired to slow the removal process. The computer arrangement then sends a signal to slow the process, such as by reducing the power level of the removal device. The threshold level may also correspond to reaching an endpoint of the removal process, wherein the computer arrangement sends a control signal to stop the substrate removal via the removal device. In this manner, the substrate removal process can be automatically controlled in response to the change in the reflected light from the die.

Figure 5:
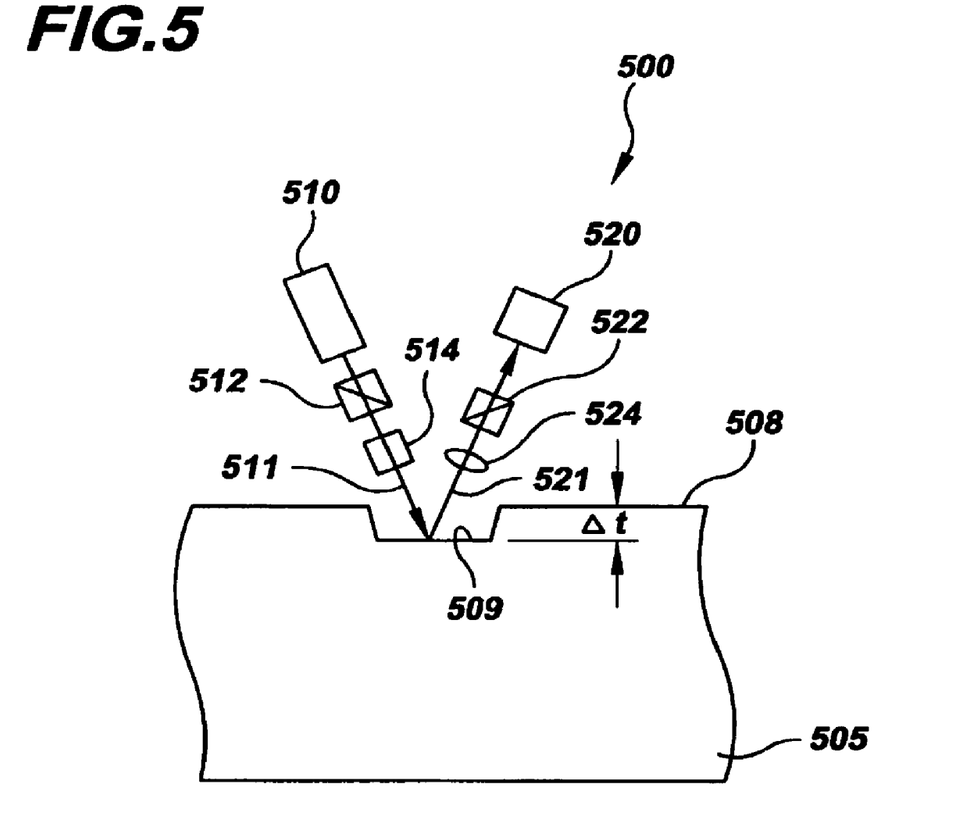
FIG. 5 is a system for removing substrate from a semiconductor die, according to another example embodiment of the present invention.

FIG. 5 shows a die 505 undergoing ellipsometry, according to another example embodiment of the present invention. Prior to substrate removal from a surface 508 of the die 505, the polarization of light reflected from the die is detected. A portion of the substrate is removed to expose region 509 and the polarization of reflected light 521 from the die is again detected. The reflected light 521 includes components of light reflected from the surface and from within the die (e.g., from layer interfaces, circuitry and other die components). The polarization of the reflected light is related to these components and depends in part upon the thickness of the substrate. When substrate is removed to expose region 509, the change in thickness "t" of the die is detected via a change in polarization of the reflected light. The change in thickness is useful, for example, for controlling the substrate removal from the die, such as for removing substrate to a selected thickness or for removing an entire layer of material from the die.

FIG. 5 also shows one example ellipsometry arrangement 500 that can be used to detect change in thickness. A laser 510 is used to direct a beam of light 511 through a polarizer 512, a retarder 514 and towards the die 505. Reflected light 521, including components from the exposed surface 509 and from components in the die. The reflected light 521 passes through an objective 524, an analyzer 522 and to a CCD camera 520. The change in polarization of the light captured at the CCD camera 520 from before and after the substrate has been removed to thickness "t" is detected and used to detect the thickness "t" of substrate that has been removed. For instance when the incident light 511 is linearly polarized, an elliptical polarization of the reflected light 521, due at least in part to the index of refraction of the substrate in the die, can be detected. The change in polarization (e.g., a change in the polarization angle) is related to the change in thickness. By knowing the composition of the substrate being removed and/or via experimentation, the change in polarization is correlated to the thickness of substrate having been removed. One example ellipsometry arrangement that can be used in connection with this example embodiment includes the model I-Elli2000 Imaging Ellipsometer made by Nanofilm Technologie GmbH and available from Accurion LLC of Newark Calif., 94560. In addition, for more information regarding ellipsometry in general and in specific application to semiconductor analysis in connection with the present invention, reference may be made to *Spectroscopic Ellipsometry and Reflectometry: A User's Guide*. Tompkins, H. G. and McGahan, W. A. (1999). New York, John Wiles & Sons, Inc., which is fully incorporated herein by reference.

While the present invention has been described with reference to several particular example embodiments, those skilled in the art will recognize that many changes may be made thereto without departing from the spirit and scope of the present invention, which is set forth in the following claims.

What is claimed is:

1. A method for removing substrate from a semiconductor die, the method comprising:
   directing light at the die;
   detecting a portion of the directed light that is reflected from the die;
   responsive to the detected portion of the light, removing a portion of the substrate from the die including forming an exposed region in the die, the amount of substrate being removed being controlled as a function of the detected light; and
   electrically accessing the die via the exposed region and analyzing the die.

2. A method for removing substrate from a semiconductor die, the method comprising:
   directing light at the die including directing light at a target region in the die and reflecting at least a portion of the light from the target region and further including reflecting a second portion of the light from a surface of the substrate;
   detecting a reflected portion of the directed light that is reflected from the die including detecting the reflected portion of light from the target region and the second reflected portion of the light from the surface of the substrate; and
   responsive to the detected portion of the light, removing a portion of the substrate from the die, the amount of substrate being removed being controlled as a function of the detected light and further including controlling the substrate removal as a function of the phase difference between the reflected portion of light from the target region and the second reflected portion of the light from the surface of the substrate.

3. A method for removing substrate from a semiconductor die, the method comprising:
   directing light at the die;
   detecting a reflected portion of the directed light that is reflected from the die including detecting a phase difference in light reflected from different portions of the die; and
   responsive to the detected portion of the light, removing a portion of the substrate from the die, the amount of substrate being removed being controlled as a function of the detected light.

4. The method of claim 3, wherein the substrate has a plurality of layers and an interface between each layer, wherein detecting a phase difference in light reflected from different portions of the die includes detecting light reflected from at least one interface between layers of material in the die.

5. A method for removing substrate from a semiconductor die, the method comprising:
   directing light at the die;
   detecting a portion of the directed light that is reflected from the die including detecting a phase difference in light reflected from different portions of the die; and
   responsive to the detected portion of the light, removing a portion of the substrate from the die, the amount of substrate being removed being controlled as a function of the detected light wherein the substrate includes at least a first layer and a second layer formed on and contiguously adjacent the first layer, wherein removing a portion of the substrate from the die includes removing the first layer, and wherein detecting a reflected portion of the light includes detecting that the first layer has been removed including:
   detecting that the reflected portion of light includes a portion having passed through at least a portion of the first layer; and
   subsequent to removing the first layer, detecting that the reflected portion of light has not passed through the first layer.

6. A method for removing substrate from a semiconductor die, the method comprising:
   directing light at the die, which includes a silicon-on-insulator (SOI) portion;
   detecting a reflected portion of the directed light that is reflected from the die including detecting at least a portion reflected from the insulator portion of the SOI structure; and
   responsive to the detected portion of the light, removing a portion of the substrate from the die, the amount of substrate being removed being controlled as a function of the detected light.

7. A method for removing substrate from a semiconductor die, the method comprising:
   directing light at the die;
   detecting a reflected portion of the directed light that is reflected from the die including detecting an interference pattern from the reflected light;
   responsive to the detected portion of the light, removing a portion of the substrate from the die, the amount of substrate being removed being controlled as a function of the detected light; and
   electrically accessing the die via the exposed region and analyzing the die.

8. The method of claim 7, wherein removing a portion of the substrate in response to the detected portion of light includes detecting the amount of substrate remaining in the die by comparing the interference pattern with a reference interference pattern obtained from a reference die, the reference die having a known amount of substrate having been removed corresponding with the interference pattern.

9. A method for removing substrate from a semiconductor die, the method comprising:
   directing light at the die;
   detecting a portion of the directed light that is reflected from the die; and
   responsive to the detected portion of the light, removing a portion of the substrate from the die, the amount of substrate being removed being controlled as a function of the detected light, including:
   removing substrate at a first removal rate until a point at which the reflected portion of light reaches a first threshold level defined as a function of the semiconductor die under test and the step of detecting;
   reducing the removal rate to a second removal rate, responsive to reaching the first threshold level;
   removing substrate at the second removal rate until the reflected portion reaches a second threshold level defined as a function of the semiconductor device under test and the step of detecting; and
   responsive to reaching the second threshold level, stopping the removal process.

10. The method of claim 9, further comprising using a computer arrangement programmed to respond to the detected reflected light, reduce the removal rate, and stop the removal process.

11. A method for removing substrate from a semiconductor die, the method comprising:
    directing light at the die;
    detecting a portion of the directed light that is reflected from the die; and
    responsive to the detected portion of the light, removing a portion of the substrate from the die, the amount of substrate being removed being controlled as a function of the detected light including estimating the amount of substrate remaining between a target region in the die and an exposed region of the substrate based on a phase change of the reflected light.

12. The method of claim 11, wherein estimating the amount of substrate remaining includes conducting empirical tests to determine a standard relationship of changes in the reflected portion of the light to substrate remaining in the die.

13. A method for removing substrate from a semiconductor die having target circuitry in a circuit side opposite a back side, the method comprising:
    removing a portion of substrate from the back side of the die and forming an exposed region;
    directing light at the exposed region;
    detecting an interference pattern of reflected light from the die, the reflected light including portions reflected from the exposed region and from the target circuitry;
    detecting the number of fringes in the interference pattern; and
    using the detected number of fringes and a known wavelength of the light as it passes through substrate in the die to detect the distance between the exposed region and the target circuitry, wherein the amount of substrate removed from the die is controlled as a function of detected light reflected from the die.

14. A system for controlling substrate removal from a semiconductor die, the system comprising:
    a light source adapted to direct light at the die;
    a detection arrangement including an interferometer adapted to detect a portion of the directed light that is reflected from the die including first and second portions of light;
    a substrate removal arrangement adapted to remove a portion of the substrate from the die in response to the detected portion of the directed light including a controller adapted to control the substrate removal in response to the detected light and further adapted to control the substrate removal device in response to the first and second detected portions, the amount of substrate removal being controlled as a function of the detected light; and electrically accessing the die via the exposed region and analyzing the die.

15. The system of claim 14 wherein the detection arrangement includes a photodiode adapted to detect interference patterns from the interferometer and to provide data representing the reflected light via an output, the output being communicatively coupled to the controller, wherein the controller is adapted to control the substrate removal in response to the data received via the output.

16. The system of claim 14, wherein the detection arrangement includes a beam splitter and a mirror adapted to direct a reference portion of the light from the light source to the interferometer, the reference portion being one of the first and second portions of light, the other of the first and second portions of light being reflected light from the die, the interferometer being adapted to generate an interference pattern from the first and second portions of light, wherein the substrate removal arrangement is controlled as a function of the interference pattern.

17. A method for removing substrate from a semiconductor die having an exposed surface, the method comprising:

directing light at the exposed surface;

detecting the polarization of a portion of the directed light that is reflected from the exposed surface with an ellipsometer;

responsive to the detected polarization of the light, removing a portion of the substrate from the die, wherein the amount of substrate removed from the die is controlled as a function of detected light reflected from the die; and electrically accessing the die via the exposed region and analyzing the die.

18. The method of claim 17, wherein detecting the polarization of the reflected light includes detecting a change in polarization, the change in polarization being responsive to a decreased thickness of an exposed layer of substrate in the die that includes the exposed surface.

19. The method of claim 18, further comprising detecting the thickness the exposed layer of substrate, prior to removing substrate from the die, wherein detecting a change in polarization includes detecting a change in polarization, relative to the polarization of light reflected from the surface, prior to the removal of substrate.

20. The method of claim 19, wherein detecting the change in polarization includes detecting the remaining thickness of a layer of substrate in the die, and wherein removing a portion of substrate from the die includes removing substrate in response to the remaining thickness.

21. The method of claim 17, wherein directing light at the exposed surface includes directing light at non-normal incidence to the exposed surface.

* * * * *

UNITED STATES PATENT AND TRADEMARK OFFICE
CERTIFICATE OF CORRECTION

| | | |
|---|---|---|
| PATENT NO. | : 7,196,800 B1 | Page 1 of 1 |
| APPLICATION NO. | : 10/205780 | |
| DATED | : March 27, 2007 | |
| INVENTOR(S) | : Birdsley et al. | |

It is certified that error appears in the above-identified patent and that said Letters Patent is hereby corrected as shown below:

In the Claims

Col. 14, line 14, Claim 19: "the thickness the exposed layer" should read -- the thickness of the exposed layer --.

Signed and Sealed this

Twenty-ninth Day of May, 2007

JON W. DUDAS
*Director of the United States Patent and Trademark Office*